US010003838B2

(12) United States Patent
Hardie

(10) Patent No.: US 10,003,838 B2
(45) Date of Patent: Jun. 19, 2018

(54) CLIENT-SIDE SCOUT AND COMPANION IN A REAL-TIME BIDDING ADVERTISEMENT SYSTEM

(71) Applicant: Yahoo Holdings, Inc., Sunnyvale, CA (US)

(72) Inventor: Brian Hardie, San Francisco, CA (US)

(73) Assignee: OATH INC., New York, NY (US)

(*) Notice: Subject to any disclaimer, the term of this patent is extended or adjusted under 35 U.S.C. 154(b) by 0 days. days.

(21) Appl. No.: 14/535,077

(22) Filed: Nov. 6, 2014

(65) Prior Publication Data
US 2015/0128157 A1 May 7, 2015

Related U.S. Application Data

(60) Provisional application No. 61/900,902, filed on Nov. 6, 2013.

(51) Int. Cl.
H04H 60/32 (2008.01)
H04N 7/16 (2011.01)
H04N 21/2547 (2011.01)
H04N 21/81 (2011.01)
H04N 21/2343 (2011.01)
H04N 21/41 (2011.01)
H04N 21/658 (2011.01)

(52) U.S. Cl.
CPC ... H04N 21/2547 (2013.01); H04N 21/23439 (2013.01); H04N 21/4126 (2013.01); H04N 21/6581 (2013.01); H04N 21/812 (2013.01)

(58) Field of Classification Search
None
See application file for complete search history.

(56) References Cited

U.S. PATENT DOCUMENTS

| 7,793,227 | B2 | 9/2010 | Wada et al. |
| 8,145,528 | B2 | 3/2012 | Gilley et al. |
| 8,266,009 | B1 | 9/2012 | Devlin et al. |
| 8,275,880 | B2 | 9/2012 | Allard et al. |
| 8,275,887 | B2 | 9/2012 | Li et al. |
| 8,467,660 | B2 | 6/2013 | Gilpin |
| 8,701,145 | B1 * | 4/2014 | Berger et al. ............. 725/86 |

(Continued)

FOREIGN PATENT DOCUMENTS

WO 02/39361 5/2002

OTHER PUBLICATIONS

The International Search Report and The Written Opinion issued in PCT Appln. No. PCT/US14/64386 dated Mar. 26, 2015 (16 pgs).

(Continued)

Primary Examiner — William J Kim
(74) Attorney, Agent, or Firm — Cooper Legal Group, LLC

(57) ABSTRACT

A client-side component in a real-time bidding (RTB) system for video advertisements configures the client device to, in response to a request for a video advertisement sent by the client device to the real-time bidding system, receive a first set of information associated with the video advertisement, parse the received first set of information to obtain the video advertisement and associated pixel firing information, provide the video advertisement to a video player on the client device, and fire a first pixel upon occurrence of a first predefined event associated with the video advertisement.

28 Claims, 8 Drawing Sheets

(56) References Cited

U.S. PATENT DOCUMENTS

| | | | |
|---|---|---|---|
| 2002/0097267 A1* | 7/2002 | Dinan et al. | 345/757 |
| 2005/0021803 A1 | 1/2005 | Wren, II | |
| 2005/0149851 A1 | 7/2005 | Mittal | |
| 2006/0212350 A1 | 9/2006 | Ellis et al. | |
| 2008/0162206 A1* | 7/2008 | Mak et al. | 705/7 |
| 2008/0306816 A1 | 12/2008 | Matthys et al. | |
| 2010/0228637 A1 | 9/2010 | Ghosh et al. | |
| 2010/0228693 A1 | 9/2010 | Dawson | |
| 2010/0293479 A1 | 11/2010 | Rousso et al. | |
| 2010/0306066 A1* | 12/2010 | Binnewies et al. | 705/14.73 |
| 2011/0125593 A1* | 5/2011 | Wright | G06Q 30/02 705/14.73 |
| 2011/0173071 A1* | 7/2011 | Meyer et al. | 705/14.54 |
| 2011/0231240 A1* | 9/2011 | Schoen | G06Q 30/0242 705/14.41 |
| 2011/0246267 A1 | 10/2011 | Williams et al. | |
| 2011/0246298 A1* | 10/2011 | Williams | G06Q 30/02 705/14.53 |
| 2012/0136728 A1 | 5/2012 | Hsiung et al. | |
| 2012/0278183 A1* | 11/2012 | Fortuna et al. | 705/14.72 |
| 2012/0284593 A1 | 11/2012 | Rodriguez | |
| 2013/0067035 A1 | 3/2013 | Amanat et al. | |
| 2013/0080330 A1 | 3/2013 | Francis et al. | |
| 2013/0090986 A1* | 4/2013 | Casinelli et al. | 705/7.32 |
| 2013/0158690 A1* | 6/2013 | Rijkom et al. | 700/94 |
| 2013/0227401 A1 | 8/2013 | Kandekar | |
| 2013/0332460 A1 | 12/2013 | Pappas | |
| 2014/0181243 A1* | 6/2014 | Nieuwenhuys | H04L 29/06448 709/217 |
| 2014/0229159 A1 | 8/2014 | Branton | |
| 2014/0279032 A1* | 9/2014 | Roever | G06Q 30/0267 705/14.64 |

OTHER PUBLICATIONS

Invitation to Pay Additional Fees and, Where Applicable, Protest Fee issued in PCT Application No. PCT/US14/64386 dated Jan. 29, 2015 (2 pgs).

Interactive Advertising Bureau (IAB) Impression Exchange Implementation Guidelines Version 2.0, dated Oct. 1, 2011, 17 pages.

European Search Report from corresponding European Application No. 14762387.0 dated Jul. 22, 2016, 11 pages.

* cited by examiner

CLIENT-SIDE SCOUT AND COMPANION IN A REAL-TIME BIDDING ADVERTISEMENT SYSTEM

CROSS REFERENCE TO RELATED APPLICATION

This patent document claims the benefit of priority from U.S. provisional application No. 61/900,902 entitled "CLIENT-SIDE SCOUT AND COMPANION IN A REAL-TIME BIDDING ADVERTISEMENT SYSTEM" filed on Nov. 6, 2013, which is incorporated by reference herein in its entirety.

BACKGROUND

Many companies seek to attract customers by promoting their products or services as widely as possible. Online video advertising is a form of promotion that uses the Internet and World Wide Web for delivering video advertisements to attract customers. Online advertising is often facilitated through companies called online advertising networks that connect advertisers to web sites that want to sell advertising space for displaying advertisements. Such an advertising network aggregates advertisement space supply from various websites (including on-line content publishers) and matches the aggregated advertisement space supply with advertiser demand. Advertisement exchanges are technology platforms used by online advertising networks for buying and selling online advertisement impressions. Advertisement exchanges can be useful to both buyers (advertisers and agencies) and sellers (online publishers) because of the efficiencies they provide. Advertisement exchanges are, however, often limited by the types of advertisements they can buy and sell, their inventory size, and abilities to target specific viewers (e.g., potential customers).

The growing number of users accessing the Internet using video-playback capable wireless devices such as smartphones and tablet devices creates a demand for improvements to online video advertising.

DETAILED DESCRIPTION

The disclosed embodiments facilitate RTB transactions, improve tracking and measurement of impressions, and provide additional capabilities and functionalities for a real-time bidding system for video advertisements using a client-side component that is referred to hereinafter as the Scout. The disclosed embodiments also relate to another client-side component that facilitates real-time bidding operations, and provides additional capabilities and functionalities, for a secondary/companion advertisement; the second client-side component is referred to hereinafter as the Companion or the Companion Scout.

For the purposes of illustration, the present application sometimes refers to existing industry standards and specifications to provide concrete examples of how the disclosed techniques may be used in an RTB system. However, it is understood that the disclosed embodiments can be used in conjunction with other RTB systems and/or standards.

BrightRoll Exchange (BRX) is an implementation of digital video advertisement exchange technologies by BrightRoll, Inc. (San Francisco, Calif.) and offers billions of monthly video advertising impressions, reaching millions of users on thousands of web sites and mobile applications across the different screens, such as web, mobile, tablet and connected TVs. Real-Time Bidding (RTB) allows buyers to bid on advertisement inventory using their own decisioning technology on an impression-by-impression basis, moving buy-side advertisement decisioning up the delivery chain to the buyers own platform from the publisher's advertisement server or exchange. Buyers decide whether to bid on a particular impression, how much they want to pay and which creative they want to deliver (unlike non-RTB models that require the buyer to serve an advertisement when the downstream advertisement server determines the impression meets the buyer's need, and the buyer only has an opportunity for creative optimization). The auction platform evaluates all the bids, determines the winner and serves the winning creative.

Figure 1:
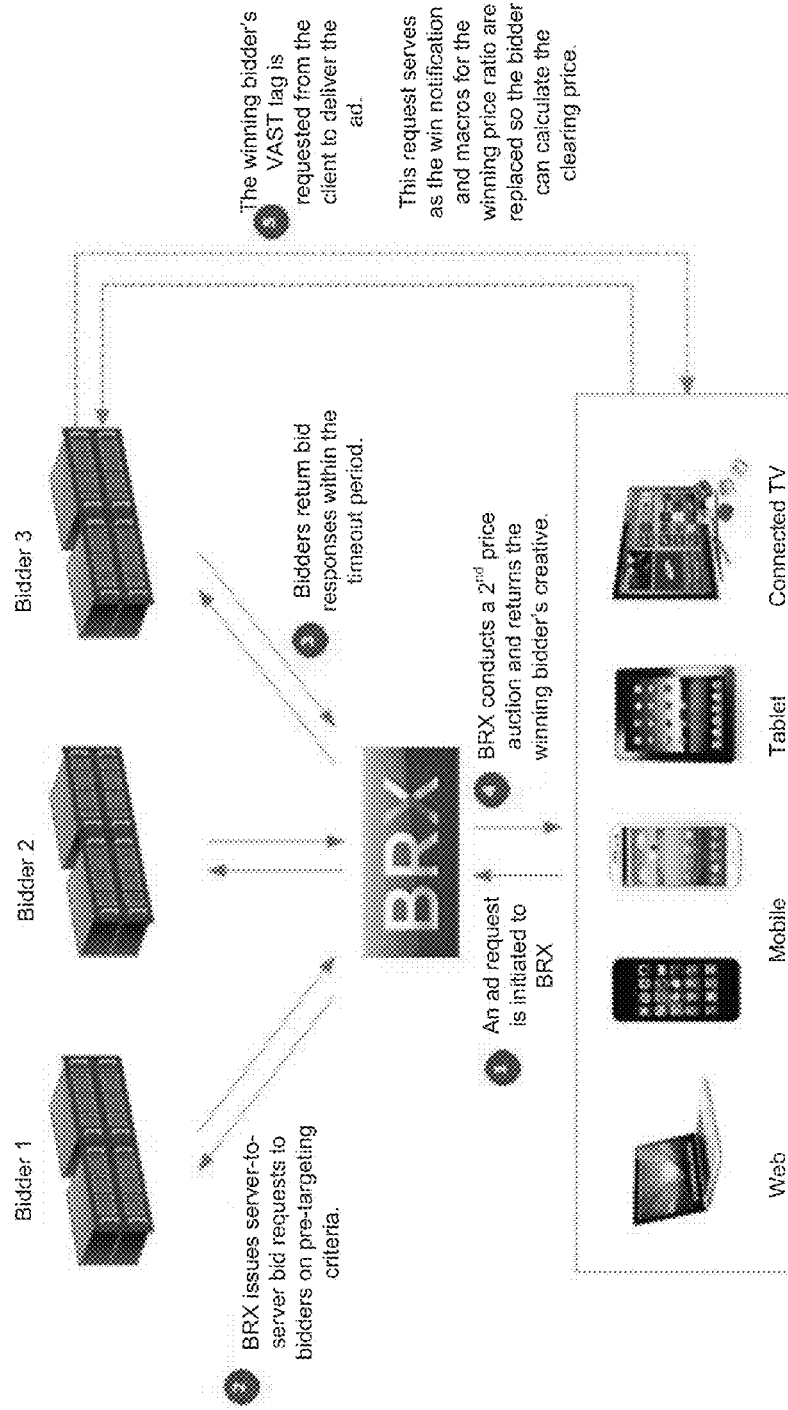
FIG. 1 is a simplified block diagram of the BRX RTB system that shows an exemplary transaction procedure.

FIG. 1 is a simplified block diagram of the BRX RTB system that shows an exemplary transaction procedure in a BRX RTB system. The described procedure is provided to facilitate the understanding of the work flow of a transaction but is not intended to provide a comprehensive description of the BRX RTB system. At 1, the user encounters a video ad opportunity on a website or in an application, and a BRX ad request is initiated. At 2, the BRX issues bid requests to bidders that qualify for the impression opportunity based on pre-targeting settings. At 3, each bidder makes an advertisement decision based on the campaigns trafficked within their systems and returns a bid response (including, e.g., a maximum bid and the creative details) within the timeout period as defined in the bid request (e.g., 90 ms). At 4, the BRX conducts a second-price auction, determines the winning bid, replaces a macro in the creative URL to reflect the clearing price (e.g., as a ratio of the maximum bid) and serves the associated creative down to the client. At 5, the website or application requests the winning creative (thereby communicating the clearing price to the bidder) and serves the ad to the user.

The Scout and the Companion of the present application are advertisement server components that reside at the client side. In some example embodiments, the Scout and the Companion are each in the form of a SWF ("Small Web Format") file that implements the Video Player-Ad Interface Definition (VPAID) specification for digital videos. Such an implementation allows the Scout and the Companion to be loaded and managed by a VPAID compliant ad player. SWF is an Adobe Flash file format used for multimedia, vector graphics and ActionScript. SWF files can contain animations or applets. They may also be used for programs using ActionScript. SWF files allow audio, video and many different possible forms of interaction with the end user. Once created, SWF files can be played by a compliant player, working either as a browser plugin or as a standalone player.

The Video Ad-Serving Template (VAST) is a specification by the Interactive Advertising Bureau (IAB) that provides a common ad response format for video players that enables video ads to be served across all compliant video players. VAST alone, however, only supports relatively simple in-stream video ad formats. These simple ad formats do not provide an interactive user experience, and do not allow the advertiser to collect rich interaction details.

Video Player Ad-Serving Interface Definition (VPAID) establishes a common interface between video players and ad units to allow interactive in-stream ad experiences. VPAID provides a communication protocol between video players and ad units, with the intention of allowing a single executable ad (one that requires software logic to be executed as part of ad playback) to be displayed in-stream with the publisher's video content, in any compliant video player. For instance, VPAID is supposed to enable the executable ad unit to expect and rely upon a common set of functionality from the video player, and the video player to expect and rely upon a common set of functionality from the executable ad unit. Despite such intentions, VPAID includes many inconsistencies and fails to provide, by itself, a consistent platform; it further lacks sufficient features for enabling various tracking and measurement functionalities, companion ad RTB placements, client-side RTB transactions, as well as other features and functionalities that may be needed in current and future RTB products.

In recognition of the above, the Scout can be configured and operated as an interface between the publisher and the advertiser. Such a Scout can be used for various functions, including addressing one or more the above shortcomings, and providing additional features and capabilities. To the publisher, the Scout appears as an ad, and to the advertiser, the Scout appears as an ad player. Among other functionalities, the Scout in accordance with the disclosed embodiments, provides, and has control over, various types of tracking information that may be desired for collection and analysis. Further, the Scout facilitates on-the-fly ad decisioning from the client side. Moreover, the Scout enables the inclusion of overlays, feedback buttons, and allows the user to opt out of viewing at least certain types of advertisements (e.g., AdChoices functionality). Additional features that are enabled in accordance with the disclosed embodiments, include tracking user engagement (e.g., whether or not a user has clicked on an interactive ad, what extent of an ad has been viewed, tracking of user "mouse-over" events, etc.), site quality measurement (e.g., whether the ad is displayed appropriately, such as whether the child-appropriate ad is being presented, whether the ad is in view or is placed within appropriate locations, whether the ad is being provided to the correct page, as identified by the URL of the page, etc.). Such site quality measurements can be collected and processed not only to identify the level of quality, but to also improve various shortcomings of advertisement provision and placement, if needed. For example, feedback may be provided to the users to allow them to take corrective actions. Moreover, the Scout allows gathering of data from a large number of vendors and provide the client with specific data corresponding to specific vendors.

The disclosed embodiments further facilitate client-side RTB, allow the extraction of page URLs, and allow the formation of a control point for ad serve positioning (whether or not to play the ad based on the obtained URL). Moreover, it allows the collection of various data, such as site referral data, and provides a platform for generation of more detailed and customized billing services based on customer preferences and needs. Such advantages and benefits are realized through the operations of the Scout and the Companion that are provided on the client device.

In various existing video ad systems, there is no flexible control over the events that actually occur when the ad is displayed. That is, even when a player is asked to perform certain tasks, there is no flexible mechanism to control and verify that such tasks were actually performed or correctly performed. The Scout in the disclosed system can be used to fill this void because the Scout runs in the ad player on the client device and thus provides a flexible platform that allows any event to be specified and tracked on an as-needed basis. Such a flexible platform allows collection of data that is not specified as part of a standard document (e.g., a VAST document). In addition, new versions (i.e., iterations) of the Scout/Companion can be readily produced and transmitted to the publisher player to allow collection of data for newly defined events or milestones, without the need for the publisher to integrate such changes into a large number (i.e., both in terms of quantity and type) of publisher players. As such, the Scout/Companion allow changes to collection and monitoring event to occur flexibly and rapidly at a large scale through various iterations to the Scout/Companion and/or the associated configuration files.

In some exemplary embodiments, the Scout has a very small footprint (e.g., about 30 Kbytes of code), which allows for efficient transmission of the Scout to the client device, as well as storage and execution thereon. In some exemplary embodiments, the Scout (and/or the Companion) include instructions that, when executed by the client device, transmit information back to the various entities (such as the Brightroll servers, third-party servers, other networked devices, etc.) at particular instances of time, when particular milestones are reached, or when particular events occur.

In an exemplary RTB workflow, where the publisher player makes a request for the ad service, and the ad servers respond with the VAST document, the VAST document includes a media file that points to the Scout and to potentially a Companion. The publisher player can load the Scout into itself using, e.g., the VPAID specification. The Scout operates to provide various features and functionalities, depending the particular RTB procedure in use. The "classic" case, the server-side RTB case and the client-side RTB case that are described in the following sections provide three examples of such RTB scenarios where the Scout and/or the Companion can be advantageously utilized.

Case 1—the classic case: In this case, the Scout is used to serve console advertisements that are provided through the BRX system. That is, the BRX system, rather than a demand partner, wins the server side auction for an advertisement. In such cases, the BRX system uses the Scout URL to identify the exact creative asset (e.g., ad) that is going to be played by the publisher player. The classic case can involve a video (e.g., a Flash Video (FLV), a VPAID unit or a third-party VAST Tag. That is, upon its execution, the Scout plays the video, the VPAID unit, or makes a request to a third-party ad server for a VAST Tag. In some embodiments, in case of video and VPAID units, the Scout may not be involved in "firing pixels" but rather the pixels (e.g., BRX pixels) are given to the publisher in, e.g., the BRX VAST response to the ad request. As such, the Scout will raise the appropriate VPAID events to the publisher player to indicate those pixels should be fired. It should be noted that the term "firing pixels" refers to triggering an http request to a server that is going to log that request to indicate that some event has happened. For example, if it is desired to track that an ad impression has occurred, an http request with some parameters related to the ad can be generated to indicate that the impression has indeed occurred.

When the classic case includes a request for a third-party VAST Tag, the Scout will request a VAST document from a third-party ad server, parse the resulting VAST document and take at supported video advertisement (e.g., FLV, mp4 or VPAID unit). Such operations are conducted from the client side. The following pseudo-code provides a simplified set of operations that may be conducted by the Scout upon receiving the third-party VAST document in accordance with an exemplary embodiment.
1) Take the first MediaFile where type=video/x-flv and delivery=progressive and duration<=site placement max duration
2) If no appropriate creative was found, take the first MediaFile where type=video/mp4 and duration<=site placement max duration and Flash player major version>=11.
3) If no appropriate creative was found, take the first MediaFile where type=application/xshockwaveflash and duration<=site placement max duration.
4) If no appropriate creative was found, fail.
5) If a creative is found:
  5A) Check for a related AdParameters element and store the contents if found.
  5B) Collect the related tracking events for this creative:
    Impression, start, creativeView (all of these are fired on the impression event)
    firstQuartile, midpoint, thirdQuartile, complete
    pause, fullscreen, mute, unmute
    clickthrough
6) Scout will then move on to playing the video/vpaid creative
  6A) If playing VPAID, pass any contents found in AdParameters on the third-Party VPAID initAd call.
  6B) Fire the collected tracking pixels at the appropriate event.

In some embodiments, the Scout uses a time-out interval to set a maximum wait time for playback of advertisements. For example, the Scout may enforce a strict 12-minute timeout between the time that it is instantiated and the time that the ad must be started. To this end, when the Scout loads, it starts a 12-minute timer. If the publisher player starts playing the ad (e.g., calls StartAd) within the 12-minute interval, the timer is cleared. However, if the timeout period elapses without playing the ad, the Scout fires an error pixel reporting the event, proceeds through its normal stopAd phase, and then raises an AdError event with a message such as: "Timeout reached: 720 seconds."

Case 2—server-side RTB (or sRTB): In the server side RTB case, third-party partners are also participate in an RTB for a particular impression. A demand partner is a partner with an ad to be displayed. That is, these partners are provided with information about the page that will display the advertisement, and the partners make a decision if they want to participate in bidding for the ad. In case of server side RTB, a demand partner, as opposed to the BRX system wins a server side auction, and thus the server demand partner is served through the BRX system. When one of these partners wins the bid, a flag is used to notify the Scout that this is an sRTB case. The Scout can then play the creative, and build and fire all the pixels to the BRX system to track impressions, midpoints, quartile points, etc. The Scout is started similar to the VAST Tag run that was described in connection with the classic case (e.g., type=VAST_TAG with get sr=y, or=<org_id> and possible gp=<comma separated list of integers>), but will also perform additional work as noted above related to building and firing pixels that is not done in the classic VAST Tag case. As such, in the sRTB case, there is at least one impression pixel, but may be more than one depending on gp parameter. In some sRTB cases, the Scout will be provided with additional parameters (e.g., pp (Packaged Pricing) and dcpr (Downstream CPR) parameters). When these additional parameters are present, the Scout will attempt to expand PACKAGED_PRICING and DCPR macros in the provided asset URL, and will include a dcpr dot var when building BRX impressions.

Case 3—client-side RTB (cRTB): Some site placements are set to receive BRX ads but also support a client side auction where the Scout offers the impression to a list of demand source partners. In this case, parameter values can be set to provide the appropriate values or flags. For example, type=r and i=<comma separated list of demand source ids>. The following pseudo-code provides a simplified set of operations that may be conducted by the Scout in a cTRB case in accordance with an exemplary embodiment.
1) During the initAd phase, the Scout makes a request back to BRX for the console ad and makes a request to each of the demand sources included.
2) Some demand sources respond with a VAST document. The response contains a bid and is otherwise parsed identically as described in the classic VAST Tag case.
3) An auction may contain one preferred bidder. A preferred bidder is processed during the auction but is not actually part of the auction. If a preferred bidder responds to a request with an ad, that ad is displayed regardless of the console ad bid or any other bids in the client-side auction.
4) After receiving the responses or timing out:
  4A) If the preferred bidder demand source is not involved or had no ad, the Scout runs an auction and selects a winner and a runner up.
  4B) If the preferred bidder demand source is involved and has an ad, the Scout selects the preferred bidder as the winner and no runner up.
5) The Scout reports the results of the auction
6) If a demand source wins, the Scout builds BRX tracking pixels for:
  impression, mid, done, click track
7) The Scout builds the Companion string to send to the Companion Scout
8) Scout then moves on to playing the creative (Video/VPAID)
  8A) If playing VPAID, pass any contents found in AdParameters on the 3rdParty VPAID initAd call.
  8B) Fire the collected tracking pixels at the appropriate events.

In summary, the publisher makes an ad request. The ad servers decide on an ad based on the BRX internal decision making logic and transmit the ad to the Scout. The Scout, before playing the ad that was provided to it, makes requests to a number of RTB partners from the client-side so that the partners which may not have a great deal of technical integration know-how but can have access to the technology provided through the Scout and the BRX system. The Scout then runs the auction, and plays the ad as described above.

In various implementations, the Scout is uniquely situated to isolate the publishers and the advertisers from one another and to allow successful RTB operations, tracking and measurements to take place to the mutual satisfaction of all parties. For instance, the publishers are protected from bad creatives. The advertisers, on the other hand, are provided with a standardized (e.g., compliant VPAID and VAST RTB) implementation that allows additional features and functionalities to be provided as described throughout this document. These features and functionalities protect the advertiser and/or the server partners from publisher limitations. For instance, as opposed to allowing the publisher to fire pixels for various tracking and measurement purposes, the Scout fires (and/or builds) the pixels as needed. Such an architecture provides many benefits since allowing the publishers to fire the pixels can lead to various discrepancies since (1) some publishers do not uniformly and properly implement standardized operations, and (2) some publishers do not have the capability to fire the pixels as needed by the advertisers or demand partners. The disclosed embodiments provide further uniformity and consistency for advertisers since an advertiser's e.g., VPAID unit, which would have needed to run on thousands of different implementations of ad players, only needs to run through the Scout, which in turn provides the advertiser with consistent RTB tracking and measurement operations.

As noted earlier, prior to playback of the video advertisements, the Scout may make a request to another ad server, parse a request to an ad server for a VAST document, collect firing pixels and tracking pixels for impressions, mids, ends, clicks, etc. Since a VAST document may refer to another VAST document, the Scout may also iterate through several VAST documents. The Scout can further perform the following tasks: provide third-party tracking and measurement, fire off segment mapping pixels (e.g., pixels that map third-party segments to BRX users) and track the URL of the page that plays the advertisement.

Third-party tracking: The Scout allows the use of third-party services for collecting data about sites that play the advertisements. After it is known which ad is going to play, the third-party tracking measurements (e.g., Nielsen, comScore and Telemetry) are initialized. These third-party measurement tools and services are extendable; that is, new services and tools can be added or existing services can be removed. For example, a new Scout code can be provided to the client to implement such changes to third-party services. Third-party tracking services may include their own libraries (e.g. JavaScript based libraries, SWFs, etc.) that can be loaded onto the Scout on the client-side to track the needed information. For instance, the Scout can embed or execute the third-party JavaScript. Once executed, the third-party library performs the prescribed actions for collecting information that is needed by the third-party service.

Once the data is provided to the third-party service (e.g., after the JavaScript transmits cookie information to Nielsen), the accumulated third-party tracking and measurement data can be collected by the BRX system (e.g., by providing a campaign ID and site information). In such third-party service applications, the Scout provides information (e.g., fires tags) that populates campaign and advertising information in a variety of different third-party services. It should be noted that in interactions with some third-party measurement services, the message exchange is asymmetric. That is, the information is provided to the third-party service at a higher granularity but the results of third-party measurements are often only available at a lower level of granularity. Such an asymmetric exchange is often done to protect the privacy of the users.

Acquisition of page URL: In some instances, it is important to obtain the URL of the page that includes the advertisement. Such a URL is not always readily available, since, for example, the ad player is sometimes embedded into a main page via an iFrame or several nested iFrames. The Scout can obtain the main page URL by crawling up the iFrame(s). The URL and identification information (e.g., auction ID obtained from the VAST document; also sometime referred to as an "extra") is sent to the BRX system. The collected URLs can be used to provide various additional functionalities, such as to provide a white list (e.g., safe sites), blacklists (prohibited sites), identify bad actors on the Internet, ascertain invalid inventory, etc.

As noted earlier, at various points during the playback of the ad, the Scout can fire one or more tracking pixels. These trigger points are determined based on occurrences of certain events, or elapsed time periods. The elapsed time points (e.g., quartile points) can be ascertained with the knowledge of total duration of the ad, which is typically obtained from file metadata. Tracking pixels are URLs (e.g., BRX or third-party) that are requested to track various ad events. These are critical to the BRX system and can be used to expedite billing, as well as monitoring the effectiveness of various ad campaigns. When parsing a VAST document, the Scout collects any tracking pixels provided and fires each of them upon receiving the corresponding event. The Scout may find and collect pixels at any number of levels while following VAST wrapper tags. The pixels are often fired in the order they were found. In any given VAST document, the Scout may find any number of pixels for each event type. All pixels are often fired in the order they were found. The following table provides a listing of some exemplary events and the corresponding pixel firing behaviors for VPAID and Video, respectively.

TABLE 1

| Event | VPAID Behavior | Video Behavior |
|---|---|---|
| impression | Fired upon receiving AdImpression | Fired upon video progress |
| start, creativeView | Fired upon receiving the AdVideoStart event | When we try to play the video |
| firstQuartile, midpoint, thirdQuartile | Fired upon receiving the corresponding VPAID AdVideo* event | Fired at 25%, 50%, and 75% progress respectively |
| complete | Fired upon receiving the | Fired upon receiving the |

TABLE 1-continued

| Event | VPAID Behavior | Video Behavior |
|---|---|---|
| | AdiVideoComplete event | AdVideoComplete event |
| pause | Fired upon receiving the AdPaused event | Fired after pausing playback |
| fullscreen | Fired after processing a resizeAd request with viewMode = 'fullscreen' | Fired after processing a resizeAd request with viewMode = 'fullscreen' |
| mute, unmute | Fired after setting the volume to 0 or non-0 respectively | Fired after setting the volume to 0 or non-0 respectively |
| ClickTracking | Fired after receiving and handling AdClickThrough | Fired after handling a click on the ad |

In the table 1 above, Click-Tracking refers to tracking a user's actions of clicking on an advertisement that directs the user to another content, ad or website. It should be noted that, based on the disclosed embodiments, other events and behaviors can be arbitrarily defined and implemented through the use of the Scout and/or the Companion. The information obtained from the tracking pixels (both from BRX and third-party VAST tags) are collected and analyzed at the BRX system. As also noted earlier, third-party services can also be provided with tracking pixels as needed.

Overlays: The Scout further provides the capability for allowing overlays to be placed on advertisements. This functionality would not be present in the absence of the Scout, if only video or VPAID units were being served. However, the Scout allows overlays (e.g., static images, icons, SWFs, etc.) to be positioned at particular locations on the ad (e.g., at specific coordinates). For example, an Adchoices icon can be placed on the screen to allow the user to opt out of certain types of advertisements. As another example, feedback buttons can be placed as overlays to allow the user to provide feedback.

Companion (sometimes referred to as the "Companion Scout"): The Companion is another client-side component that allows dynamic loading of a companion advertisement (in addition to the primary ad). In one example embodiment, the Companion is a SWF. When the Scout is running in the classic mode that serves a console video or VPAID unit, any companion ad that is linked in the console (i.e., within the BRX system) is served alongside the Scout in the VAST response. In the VAST 1 and 2 specifications, the companion ads must be included in the initial VAST response (or the final VAST response if a VAST wrapper is provided) before the ad is loaded. However, if the Scout is running in the classic mode where it is serving a console third-party VAST Tag, or is running in cRTB mode or in sRTB mode where a demand partner wins, the ad servers don't know which, if any, companion ad should be served along side the original ad. In such cases, the companion ad is communicated through a second VAST request that the Scout makes after it has parsed the first VAST response.

In order to support third-party VAST Tag functionality, as well as some cRTB and sRTB cases, the publisher is provided with a Companion before it is known which (if any) companion ad should be displayed. To this end, the BRX ad servers respond to the ad request with a VAST document containing the Scout and a Companion (e.g., in an iFrame source tag). The iFrame is loaded as a Companion Scout and is invisible. After the Scout has determined which companion ad should be displayed, the Scout uses a local connection to send the VAST containing the companion ad and the ID of the companion to be displayed. The Companion Scout on the client parses the VAST document, builds any appropriate pixels, and embeds the companion ad in its iFrame using, e.g., ExternalInterface calls to Javascript embedded in the iFrame.

Communications between the Scout and the Companion are made using a local connection (e.g., LocalConnection). The following provides an example of how local connection may be used. The Companion uses ExternalInterface to embed content in the iFrame. While the Scout is generally loaded first, it is possible that the publisher loads the Companion Scout first. To handle this, the connection starts with a handshake phase. The Companion Scout first connects to a unique channel (e.g., "cmd"+companion_xtra). This connection will block until a command is received. The Companion Scout then attempts to send a ping command to a separate channel (e.g., "ping"+companion_xtra). If the Scout has not yet connected to the ping channel, the command fails, and the Companion Scout will repeat the attempt periodically (e.g., every 250 ms up to 500 times). When the Scout finally does connect, or if the Scout had established a connection prior to the loading of the Companion Scout, the ping command is received by the Scout.

Next, the Scout sends a "setstring" command to the command channel (e.g., "cmd"+companion_xtra) and provides the companion string. This string includes the VAST document containing the Companion, the ad ID to identify the appropriate Companion element (and optionally cRTB winner information). Once the Companion Scout has received the data, it parses the VAST document and looks for a Companion to display. If cRTB information is sent, the Companion Scout builds the impression and click tracking pixels. If no Companion is found, none is displayed. If a Companion is found, the Companion Scout will use ExternalInterface to call out to the Javascript embedded in its frame. The Javascript contains a function for embedding html Companions, iFrame companions, and static Companions. The Companion Shim calls the appropriate embed function which will embed the Companion and impression pixels in the iFrame.

The location of companion ad on the page is usually determined by the publisher. The publisher is given the companion ad and is asked to place in its companion slot. The dimensions of the companion, however, are provided to the publisher (e.g., a 300×250 pixel area).

Figure 2:
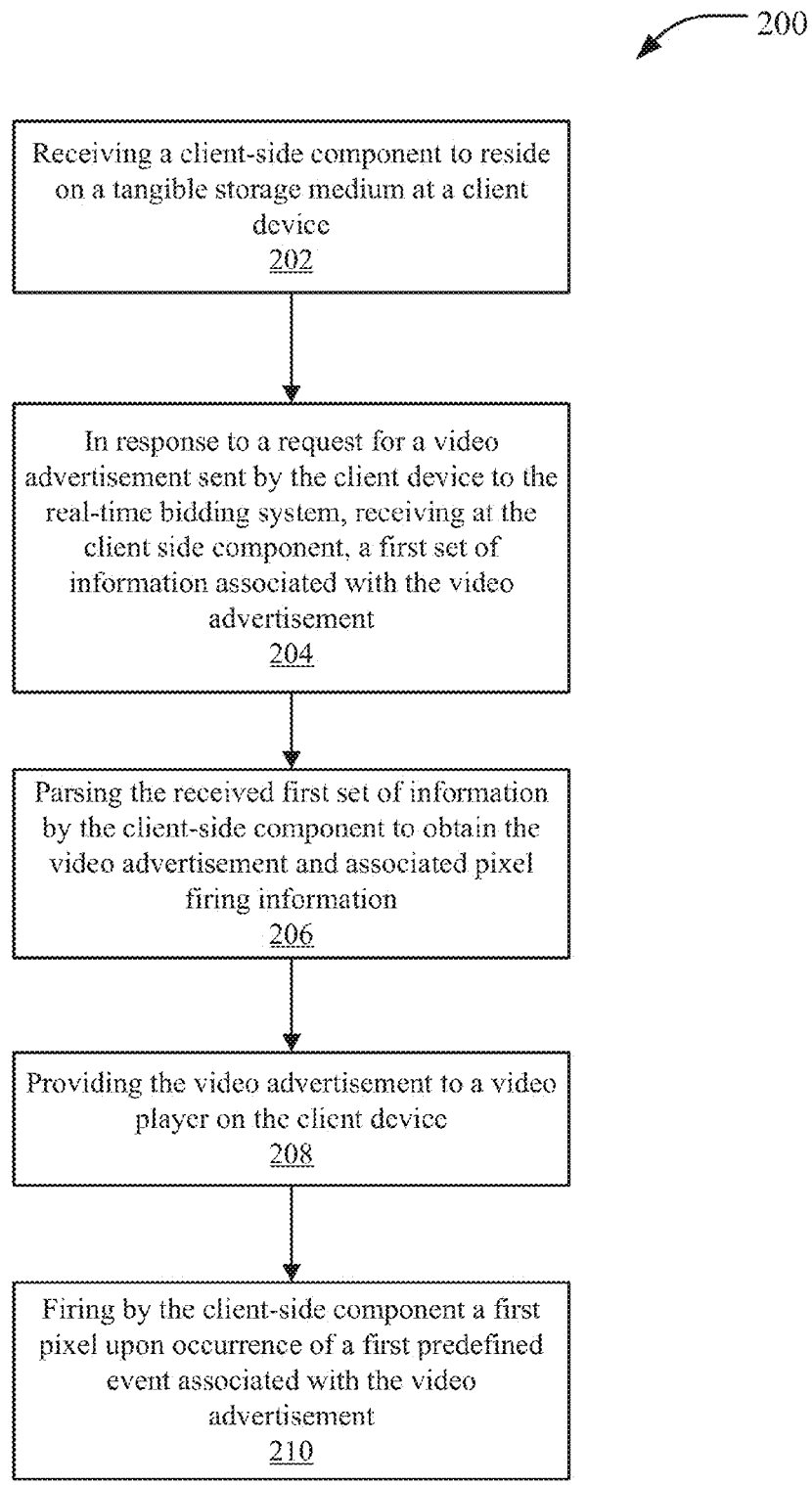
FIG. 2 illustrates a set of operations that can be carried out at a client device in a real-time bidding (RTB) system for video advertisements in accordance with an exemplary embodiment.

FIG. 2 illustrates a set of operations 200 that can be carried out at a client device in a real-time bidding (RTB) system for video advertisements in accordance with an exemplary embodiment. At 202, a client-side component is received to reside on a tangible storage medium the client device. At 204, in response to a request for a video advertisement sent by the client device to the real-time bidding system, a first set of information associated with the video advertisement is received at the client side component. At 206, the received first set of information is parsed by the client-side component to obtain the video advertisement and associated pixel firing information. At 208, the video advertisement is provided to a video player on the client device. At 210, a first pixel upon occurrence of a first predefined event associated with the video advertisement is fired by the client-side component.

Figure 3:
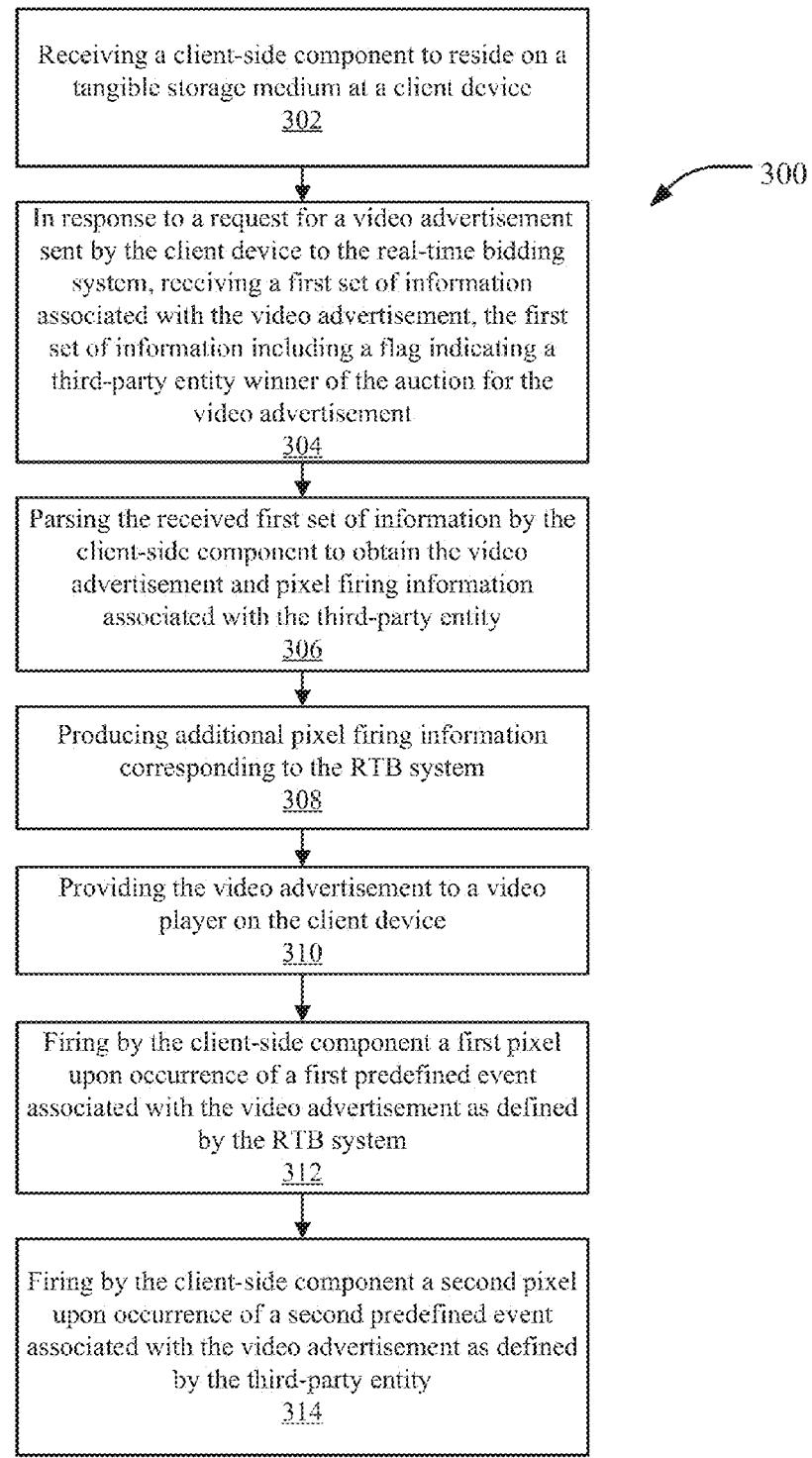
FIG. 3 illustrates a set of operations that can be carried out at a client device in a real-time bidding (RTB) system for video advertisements configured to conduct a server-side RTB auction in accordance with an exemplary embodiment.

FIG. 3 illustrates a set of operations 300 that can be carried out at a client device in a real-time bidding (RTB) system for video advertisements configured to conduct a server-side RTB auction in accordance with an exemplary embodiment. At 302, a client-side component is received to reside on a tangible storage medium at a client device. At 304, in response to a request for a video advertisement sent by the client device to the real-time bidding system, a first set of information associated with the video advertisement is received, where the first set of information including a flag indicates a third-party entity winner of the auction for the video advertisement. At 306, the received first set of information is parsed by the client-side component to obtain the video advertisement and pixel firing information associated with the third-party entity. At 308, additional pixel firing information is produced corresponding to the RTB system. At 310, the video advertisement is provided to a video player on the client device. At 312, a first pixel is fired by the client-side component upon occurrence of a first predefined event associated with the video advertisement as defined by the RTB system. At 314, a second pixel is fired by the client-side component upon occurrence of a second predefined event associated with the video advertisement as defined by the third-party entity.

Figure 4:
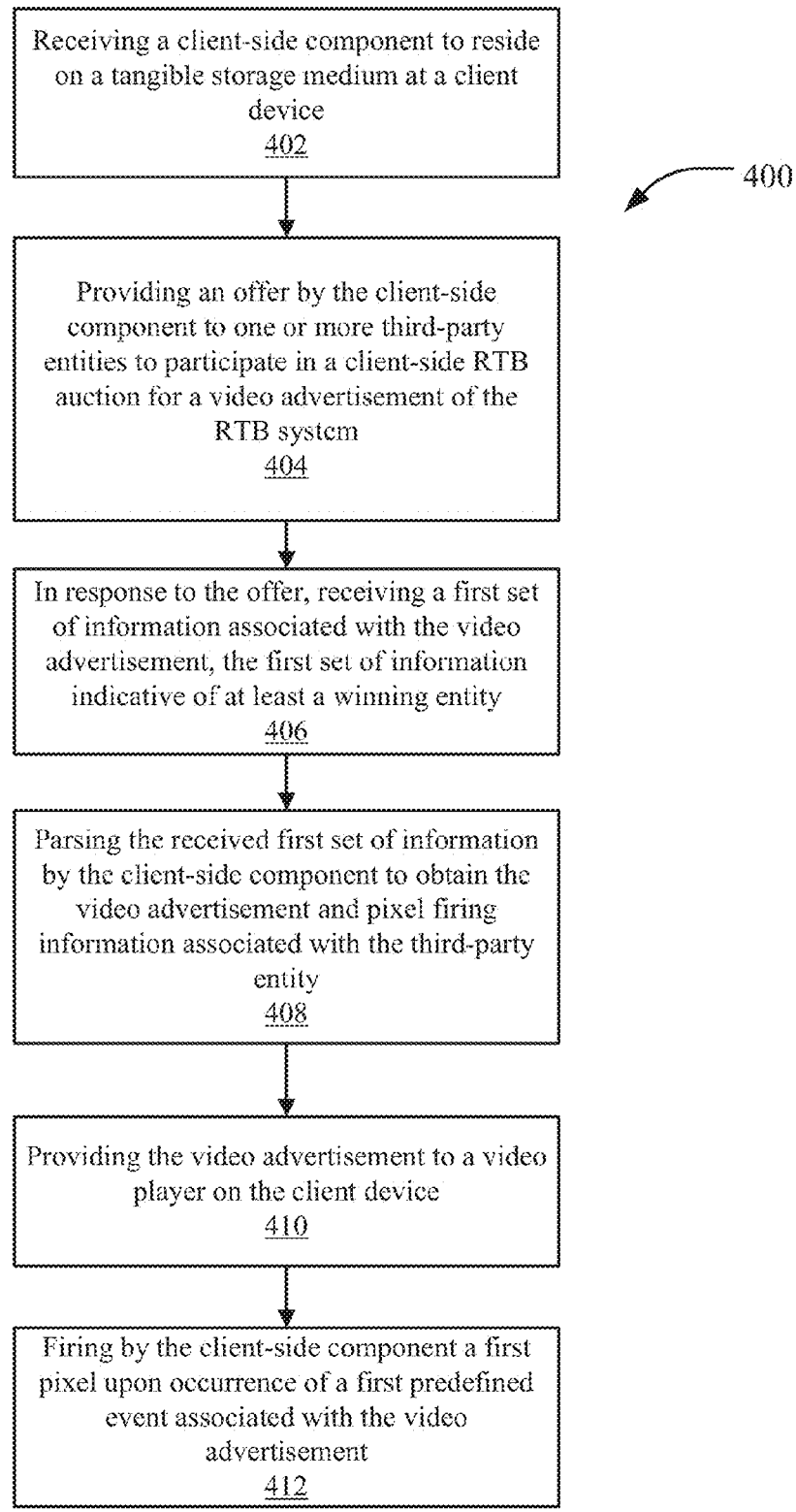
FIG. 4 illustrates a set of operations that can be carried out at a client device in a real-time bidding (RTB) system for video advertisements configured to conduct a client-side RTB auction in accordance with an exemplary embodiment.

FIG. 4 illustrates a set of operations 400 that can be carried out at a client device in a real-time bidding (RTB) system for video advertisements configured to conduct a client-side RTB auction in accordance with an exemplary embodiment. At 402, a client-side component is received to reside on a tangible storage medium at a client device. At 404, an offer is provided by the client-side component to one or more third-party entities to participate in a client-side RTB auction for a video advertisement of the RTB system. At 406, in response to the offer, a first set of information associated with the video advertisement is received, where the first set of information is at least indicative of a winning entity. At 408, the received first set of information is parsed by the client-side component to obtain the video advertisement and pixel firing information associated with the third-party entity. At 410, the video advertisement is provided to a video player on the client device. At 412, a first pixel is fired by the client-side component upon occurrence of a first predefined event associated with the video advertisement.

Figure 5:
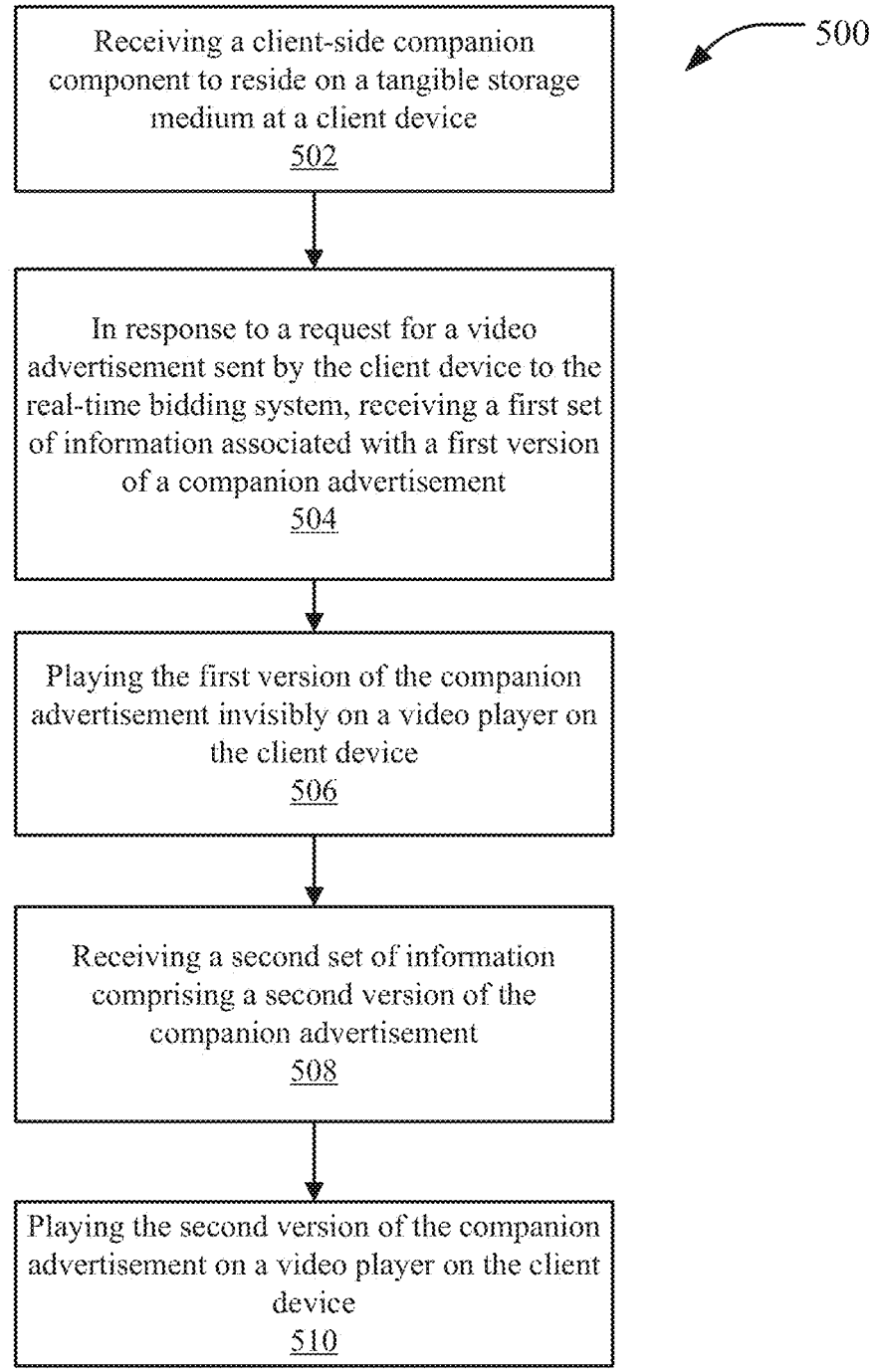
FIG. 5 illustrates a set of operations that can be carried out at a client device in a real-time bidding (RTB) system for video advertisements using a Companion client-side component in accordance with an exemplary embodiment.

FIG. 5 illustrates a set of operations 500 that can be carried out at a client device in a real-time bidding (RTB) system for video advertisements using a Companion client-side component in accordance with an exemplary embodiment. At 502, a client-side companion component is received to reside on a tangible storage medium at a client device. At 504, in response to a request for a video advertisement sent by the client device to the real-time bidding system, a first set of information associated with a first version of a companion advertisement is received. At 506, the first version of the companion advertisement is played invisibly on a video player on the client device. At 508, a second set of information comprising a second version of the companion advertisement is received. At 510, the second version of the companion advertisement is played on a video player on the client device.

Figure 6:
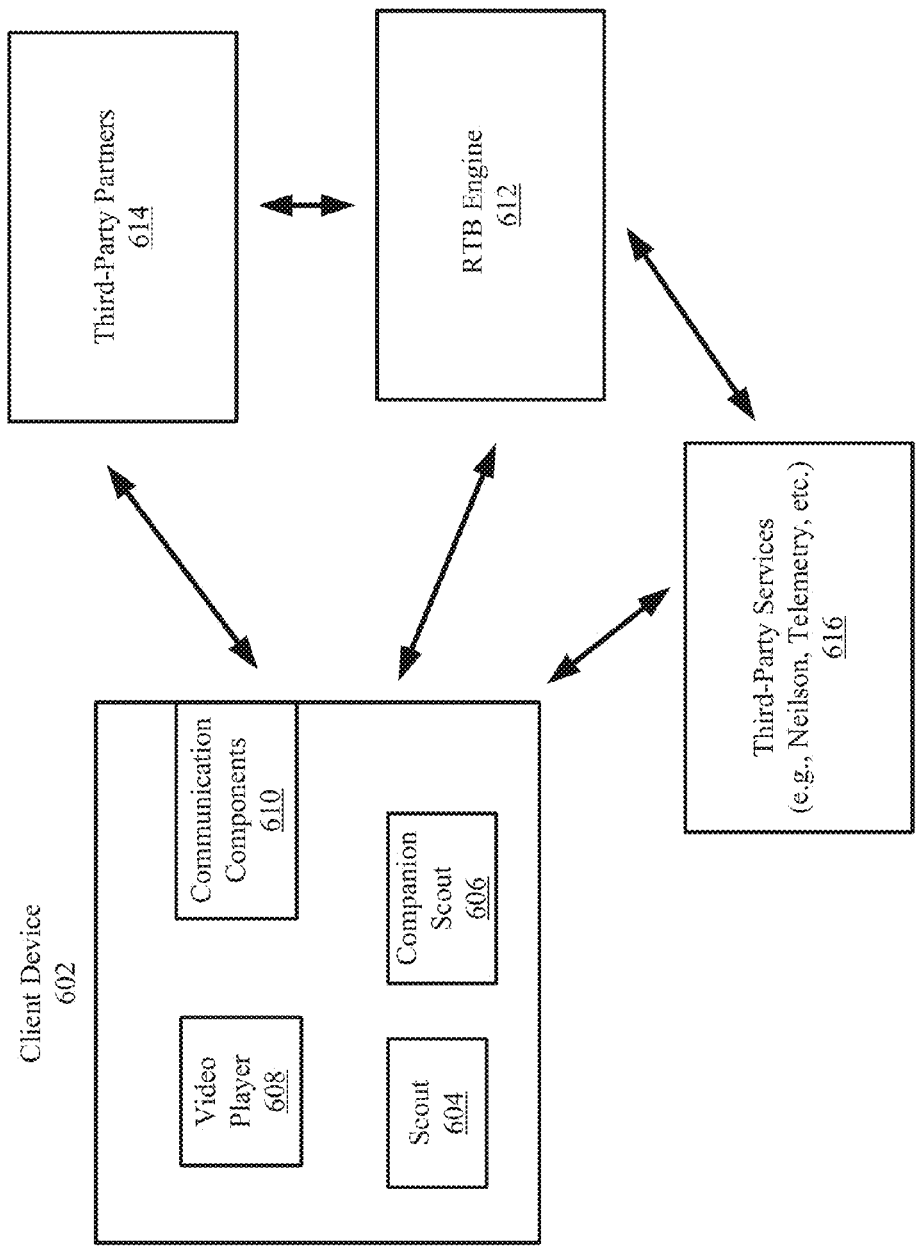
FIG. 6 illustrates a simplified diagram of a real-time bidding system that includes a plurality of client devices, third-party services, real-time bidding engine, and third-party partners in accordance with an exemplary embodiment.

FIG. 6 illustrates a simplified diagram of a real-time bidding system that includes a plurality of client devices 602 (only one client device 602 is shown). The client device 602 includes a video player 608, a Scout 604 component, and a Companion Scout 606 component. The client device 602 further includes communication components 610 that are configured to communicate through a network connection with various entities, including a real-time bidding (RTB) engine 612, one or more third-party partners 614 and one or more third-party services 616 (e.g., tracking and measurement service providers such as Neilson, etc.). The system of FIG. 6 enables various operations that are described throughout the present application.

Figure 7:
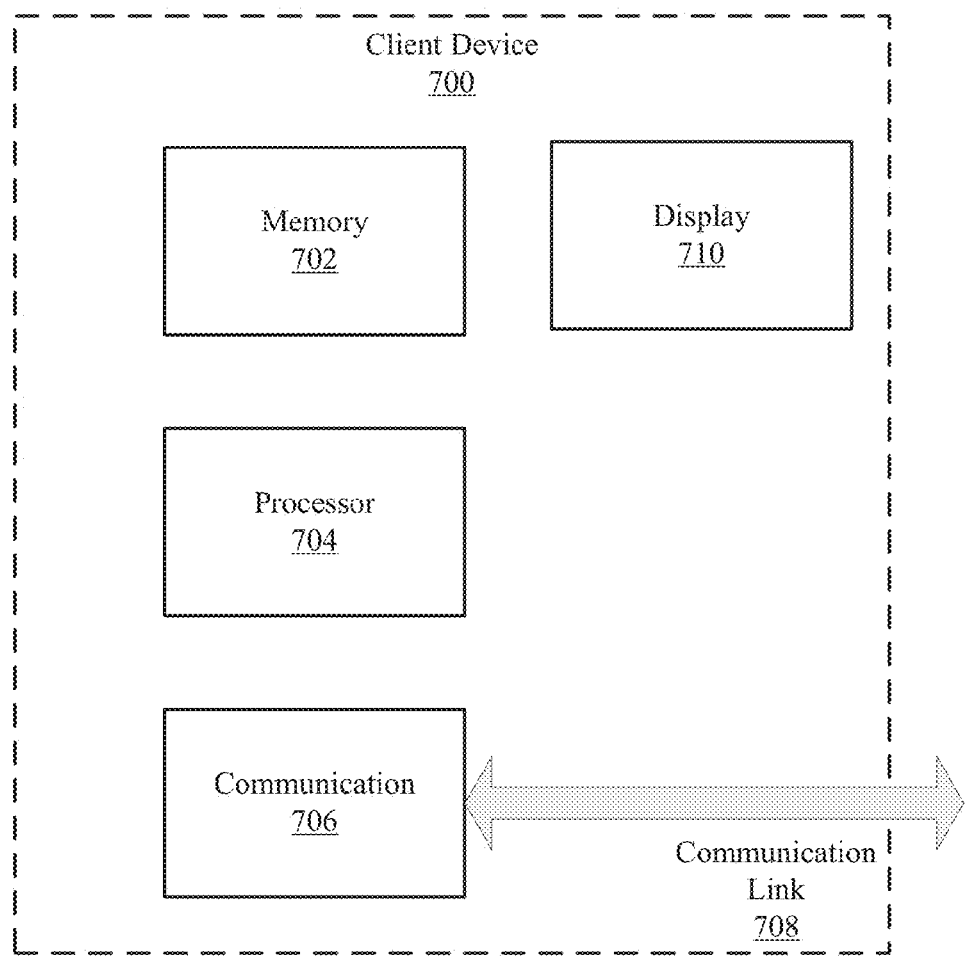
FIG. 7 illustrates a block diagram of a device within which various disclosed embodiments may be implemented.

Certain aspects of the disclosed embodiments can be implemented as a device that includes a processor and a memory comprising processor executable code. The processor executable code, when executed by the processor, configures the device to perform any one of and/or all operations that are described in the present application. For example, FIG. 7 illustrates a block diagram of a device 700 within which various disclosed embodiments may be implemented. The device 700 comprises at least one processor 707 (e.g., a microprocessor) and/or controller, at least one memory 702 unit that is in communication with the processor 707, and at least one communication unit 707 that enables the exchange of data and information, directly or indirectly, through the communication link 708 with other entities, devices, databases and networks. The communication unit 706 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The device 700 also includes a display 710 for displaying the video advertisement and the companion advertisements (if any). The exemplary device 700 of FIG. 7 may be integrated as part of any of a client device that is shown in FIG. 6.

Figure 8:
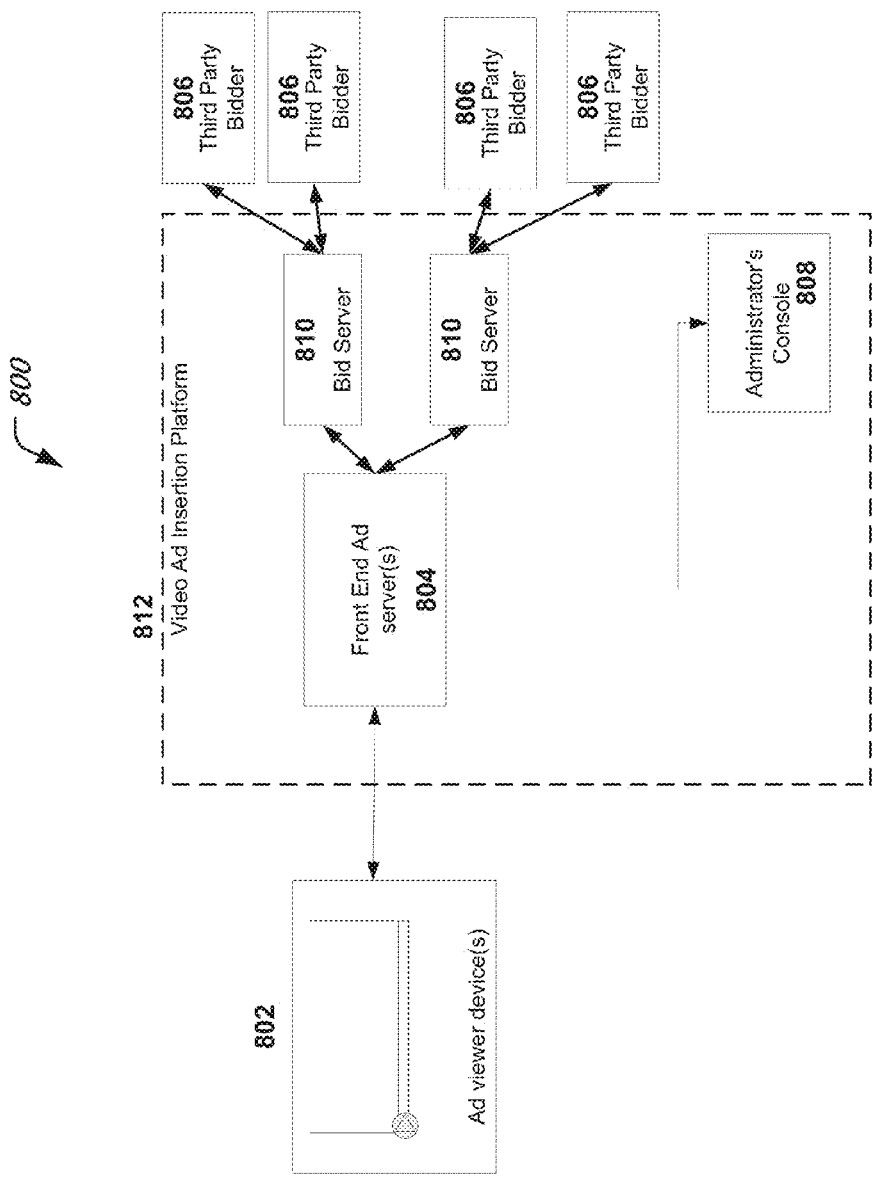
FIG. 8 illustrates an online video advertisement system that can be used to accommodate the disclosed embodiments.

FIG. 8 depicts a simplified view of an online video advertisement insertion architecture 800 that can accommodate the disclosed embodiments. An ad viewer's device 802 (e.g., a wireless or a mobile device, as discussed above) may be communicatively coupled (e.g., via the internet and a wired or wireless connection) with an ad server 804. The ad server 804 may communicate bids to show video ads to the device 802 to multiple bidders 806 via a plurality of bid server platforms 810. An operator or administrator console 808 may be provided to control the operation of the ad server 804 and bid servers 810. The ad server 804 may also be called front end ad server 804 in the sense that this ad server provides an entry into an online video advertisement system for an ad placement request from a viewer's device. The bid servers 810 provide a bidding interface between third party bidding servers and the online video advertisement service.

The ad server 804 may perform functions such as handling incoming ad requests from multiple ad viewer devices 802, and may respond with an ad or a "no ad" placement. The ad server 804 may operate on a time budget, e.g., 50 to 800 msec., within which it responds to an ad request. The ad server 804 may provide ad data to the viewer device 802 using VAST format. The decision about which advertisement to be sent may be based on various factors and real time data such as publisher placement, uniform resource locator (URL), a geographic location of the viewer device, time of day, demographic segment to which the viewer belongs, and so on.

When the ad server 804 receives a video placement request from the viewer's device 802, the ad server 804 may pass on the request to two or more bid servers 880. The request may include information about the viewer, the viewer's demographic profile and other rules associated with the ad placement opportunity that may influence the selection of a winning bid. In some embodiments, the front end ad servers 804, bid servers 810 and the administrator's console 808 may be part of a video ad insertion platform 882 offered by a single vendor, e.g., the BRX platform offered by Brightroll, Inc.

The bid servers 810 in turn request bids from multiple third party bidders 806. When bids are received from third party bidders 806, or at the end of a time period (e.g., 90 milliseconds), a decision is made about the winning bid. In some embodiments, the winning bid not only will have the highest dollar value but also should match the demographic profile of the viewer. For example, if the viewer is on the West coast, an advertisement for users on East coast may not be allowed to win bid even when the third party bidder bids the highest dollar value. The winning bidder is then notified for winning the bid. The winning bidder is provided with information to allow the winning bidder to transmit a video advertisement to the viewer.

As noted previously, the Scout and/or the Companion components (not shown in FIG. 8) reside at the ad viewer device(s) 802 and communicate with the Video Ad Insertion Platform 812, as well as third-party service providers (not shown in FIG. 8).

Various aspects of the disclosed technology can be embodied as outlined in the following clauses.

Clause 1. A client-side component in a real-time bidding (RTB) system for video advertisements, the component comprising program code stored on a tangible storage media that when executed by a processor of a client device, operates the client device to participate in a server-side RTB auction and to: in response to a request for a video advertisement sent by the client device to the real-time bidding system, receive a first set of information associated with the video advertisement, the first set of information including a flag indicating a third-party entity winner of the auction for the video advertisement; parse the received first set of information to obtain the video advertisement and pixel firing information associated with the third-party entity; produce additional pixel firing information corresponding to the RTB system; provide the video advertisement to a video player on the client device; fire a first pixel upon occurrence of a first predefined event associated with the video advertisement as defined by the RTB system; and fire a second pixel upon occurrence of a second predefined event associated with the video advertisement as defined by the third-party entity.

Clause 2. The client-side component of clause 1, wherein the video advertisement is one of a flash video (FLV) or a Video Player Ad-Serving Interface Definition (VPAID) unit.

Clause 3. The client-side component of clause 1, wherein the first set of information is provided through a Video Ad-Serving Template (VAST) document that includes a third-party VAST tag, and the program code when executed by the processor configures the device to obtain the video advertisement using the third-party VAST Tag.

Clause 4. The client-side component of clause 1, wherein the program code when executed by the processor configures the device to further provide an overlay on the video advertisement.

Clause 5. The client-side component of clause 4, wherein the overlay provides one or more of the following: an icon, a selection menu, or a feedback button.

Clause 6. The client-side component of clause 1, wherein the first predefined event is one of: a reception of an advertisement impression, an initiation of playback of the video advertisement, a first quartile playback of the video advertisement, a midpoint playback of the video advertisement, a third quartile playback of the video advertisement, a complete playback of the video advertisement, a pause in playback of the video advertisement, a resizing of the video advertisement, a change in audio level of the video advertisement, or a user interaction associated with the video advertisement.

Clause 7. The client-side component of clause 1, wherein the program code when executed by the processor further configures the device to obtain a uniform resource locator (URL) corresponding to a web page in which the video advertisement is to be played.

Clause 8. The client-side component of clause 1, wherein the program code when executed by the processor further operates the device to execute a program associated with a third-party service provider and fire one or more pixels to a destination provided by the third-party service provider upon occurrence of a predefined event as defined by the third-party service provider.

Clause 9. The client-side component of clause 1, wherein the program code when executed by the processor configures the client side component to operate as an interface between a video player on the client device, and a provider of the video advertisement.

Clause 10. The client-side component of clause 1, wherein the client-side component is reconfigurable so that additional functionalities can be added or removed from the client side component in each new version of the client-side component or each new version of an associated configuration file.

Clause 11. The client-side component of clause 1 wherein the client-side component is no larger than about 30 Kbytes.

Clause 12. A client-side component in a real-time bidding (RTB) system for video advertisements, the component comprising program code stored on a tangible storage media that when executed by a processor of a client device, operates the client device to participate in a client-side RTB auction and to provide an offer by the client-side component to one or more third-party entities to participate in a client-side RTB auction for a video advertisement of the RTB system, in response to the offer, receive a first set of information associated with the video advertisement, the first set of information at least indicative of a winning entity, parse the received first set of information to obtain the video advertisement and pixel firing information associated with the third-party entity, provide the video advertisement to a video player on the client device, and fire a first pixel upon occurrence of a first predefined event associated with the video advertisement.

Clause 13. The client-side component of clause 12, wherein the video advertisement is one of a flash video (FLV) or a Video Player Ad-Serving Interface Definition (VPAID) unit.

Clause 14. The client-side component of clause 12, wherein the first set of information is provided through a Video Ad-Serving Template (VAST) document that includes a third-party VAST tag, and the program code when executed by the processor configures the device to obtain the video advertisement using the third-party VAST Tag.

Clause 15. The client-side component of clause 12, wherein the program code when executed by the processor configures the device to further provide an overlay on the video advertisement.

Clause 16. The client-side component of clause 15, wherein the overlay provides one or more of the following: an icon, a selection menu, or a feedback button.

Clause 17. The client-side component of clause 12, wherein the first predefined event is one of: a reception of an advertisement impression, an initiation of playback of the video advertisement, a first quartile playback of the video advertisement, a midpoint playback of the video advertisement, a third quartile playback of the video advertisement, a complete playback of the video advertisement, a pause in playback of the video advertisement, a resizing of the video advertisement, a change in audio level of the video advertisement, or a user interaction associated with the video advertisement.

Clause 18. The client-side component of clause 12, wherein the program code when executed by the processor further configures the device to obtain a uniform resource locator (URL) corresponding to a web page in which the video advertisement is to be played.

Clause 19. The client-side component of clause 12, wherein the program code when executed by the processor further operates the device to execute a program associated with a third-party service provider and fire one or more pixels to a destination provided by the third-party service provider upon occurrence of a predefined event as defined by the third-party service provider.

Clause 20. The client-side component of clause 12, wherein the program code when executed by the processor configures the client side component to operate as an interface between a video player on the client device, and a provider of the video advertisement.

Clause 21. The client-side component of clause 12, wherein the client-side component is reconfigurable so that additional functionalities can be added or removed from the client side component in each new version of the client-side component or each new version of an associated configuration file.

Clause 22. The client-side component of clause 12 wherein the client-side component is no larger than about 30 Kbytes.

Clause 23. A method for facilitating playback and tracking a video advertisement in a real-time bidding (RTB) system configured to conduct a server-side RTB auction, the method comprising: receiving a client-side component to reside on a tangible storage medium at a client device, in response to a request for a video advertisement sent by the client device to the real-time bidding system, receiving a first set of information associated with the video advertisement, the first set of information including a flag indicating a third-party entity winner of the auction for the video advertisement, parsing the received first set of information by the client-side component to obtain the video advertisement and pixel firing information associated with the third-party entity, producing additional pixel firing information corresponding to the RTB system, providing the video advertisement to a video player on the client device, firing by the client-side component a first pixel upon occurrence of a first predefined event associated with the video advertisement as defined by the RTB system, and firing by the client-side component a second pixel upon occurrence of a second predefined event associated with the video advertisement as defined by the third-party entity.

Clause 24. The method of clause 23, further comprising providing an overlay for display on top the video advertisement.

Clause 25. The method of clause 24, wherein the overlay provides one or more of the following: an icon, a selection menu, or a feedback button.

Clause 26. The method of clause 23, wherein the first predefined event is one of: a reception of an advertisement impression, an initiation of playback of the video advertisement, a first quartile playback of the video advertisement, a midpoint playback of the video advertisement, a third quartile playback of the video advertisement, a complete playback of the video advertisement, a pause in playback of the video advertisement, a resizing of the video advertisement, a change in audio level of the video advertisement, or a user interaction associated with the video advertisement.

Clause 27. The method of clause 23, further comprising obtaining a uniform resource locator (URL) corresponding to a web page in which the video advertisement is to be played.

Clause 28. The method of clause 23, further comprising: executing a program associated with a third-party service provider; and firing one or more pixels to a destination provided by the third-party service provider upon occurrence of a predefined event as defined by the third-party service provider.

Clause 29. The method of clause 23, wherein the client side component to operates as an interface between a video player on the client device, and a provider of the video advertisement.

Clause 30. The method of clause 23, wherein the client-side component is reconfigurable so that additional functionalities can be added or removed from the client side component in each new version of the client-side component or each new version of an associated configuration file.

Clause 31. The method of clause 23, wherein the client-side component is no larger than about 30 Kbytes.

Clause 32. A method for facilitating playback and tracking a video advertisement in a real-time bidding (RTB) system configured to conduct a client-side RTB auction, the method comprising: receiving a client-side component to reside on a tangible storage medium at a client device, providing an offer by the client-side component to one or more third-party entities to participate in a client-side RTB auction for a video advertisement of the RTB system, in response to the offer, receiving a first set of information associated with the video advertisement, the first set of information at least indicative of a winning entity, parsing the received first set of information by the client-side component to obtain the video advertisement and pixel firing information associated with the third-party entity, providing the video advertisement to a video player on the client device, and firing by the client-side component a first pixel upon occurrence of a first predefined event associated with the video advertisement.

Clause 33. The method of clause 32, further comprising providing an overlay for display on top the video advertisement.

Clause 34. The method of clause 33, wherein the overlay provides one or more of the following: an icon, a selection menu, or a feedback button.

Clause 35. The method of clause 32, wherein the first predefined event is one of: a reception of an advertisement impression, an initiation of playback of the video advertisement, a first quartile playback of the video advertisement, a midpoint playback of the video advertisement, a third quartile playback of the video advertisement, a complete playback of the video advertisement, a pause in playback of the video advertisement, a resizing of the video advertisement, a change in audio level of the video advertisement, or a user interaction associated with the video advertisement.

Clause 36. The method of clause 32, further comprising obtaining a uniform resource locator (URL) corresponding to a web page in which the video advertisement is to be played.

Clause 37. The method of clause 32, further comprising: executing a program associated with a third-party service provider; and firing one or more pixels to a destination provided by the third-party service provider upon occurrence of a predefined event as defined by the third-party service provider.

Clause 38. The method of clause 32, wherein the client side component to operates as an interface between a video player on the client device, and a provider of the video advertisement.

Clause 39. The method of clause 32, wherein the client-side component is reconfigurable so that additional functionalities can be added or removed from the client side component in each new version of the client-side component or each new version of an associated configuration file.

Clause 40. The method of clause 32, wherein the client-side component is no larger than about 30 Kbytes.

Clause 41. A computer program product for facilitating playback and tracking a video advertisement in a real-time bidding (RTB) system configured to conduct a server-side RTB auction, the computer program product embodied on a non-transitory storage medium at a client device of the RTB system, the computer program product comprising: program code for, in response to a request for a video advertisement sent by the client device to the real-time bidding system, receiving a first set of information associated with the video advertisement, the first set of information including a flag indicating a third-party entity winner of the auction for the video advertisement, program code for parsing the received first set of information to obtain the video advertisement and pixel firing information associated with the third-party entity, program code for producing additional pixel firing information corresponding to the RTB system, program code for providing the video advertisement to a video player on the client device, program code for firing a first pixel upon occurrence of a first predefined event associated with the video advertisement as defined by the RTB system, and program code for firing a second pixel upon occurrence of a second predefined event associated with the video advertisement as defined by the third-party entity.

Clause 42. A computer program product for facilitating playback and tracking a video advertisement in a real-time bidding (RTB) system configured to conduct a client-side RTB auction, the computer program product embodied on a non-transitory storage medium at a client device of the RTB system, the computer program product comprising: program code for providing an offer to one or more third-party entities to participate in a client-side RTB auction for a video advertisement of the RTB system, program code for, in response to the offer, receiving a first set of information associated with the video advertisement, the first set of information further indicative of a winning entity, program code for parsing the received first set of information to obtain the video advertisement and pixel firing information associated with the third-party entity, program code for providing the video advertisement to a video player on the client device, and program code for firing a first pixel upon occurrence of a first predefined event associated with the video advertisement.

Clause 43. A client-side companion component in a real-time bidding (RTB) system for video advertisements, the companion component comprising program code stored on a tangible storage media that when executed by a processor of a client device, configures the client device to: in response to a request for a video advertisement sent by the client device to the real-time bidding system, receive a first set of information associated with a first version of a companion advertisement, provide the first version of the companion advertisement to run invisibly on a video player on the client device, and receive a second set of information comprising a second version of the companion advertisement, and provide the second version of the companion advertisement to run on a video player on the client device.

Clause 44. The client-side companion component of clause 43, wherein the first set of information is provided through a Video Ad-Serving Template (VAST) document that includes a third-party VAST tag, and the program code when executed by the processor configures the device to obtain the second set of information using the third-party VAST Tag.

Clause 45. The client-side companion component of clause 42, wherein the second set of information is obtained from a third-party entity winner in one of a server-side RTB auction or a client-side RTB auction.

Clause 46. The client-side component of clause 43, wherein the first version of companion advertisement is a dummy version of the companion advertisement that is used as a substitute for the second version of the companion advertisement.

Clause 47. A method for facilitating playback and tracking a video advertisement in a real-time bidding (RTB) system, the method including receiving a client-side companion component to reside on a tangible storage medium at a client device, in response to a request for a video advertisement sent by the client device to the real-time bidding system, receiving a first set of information associated with a first version of a companion advertisement, playing the first version of the companion advertisement invisibly on a video player on the client device, and receiving a second set of information comprising a second version of the companion advertisement, and playing the second version of the companion advertisement on a video player on the client device.

Clause 48. A computer program product for facilitating playback and tracking a video advertisement in a real-time bidding (RTB) system, the computer program product embodied on a non-transitory storage medium at a client device of the RTB system, the computer program product including: program code for, in response to a request for a video advertisement sent by the client device to the real-time bidding system, receiving a first set of information associated with a first version of a companion advertisement, program code for providing the first version of the companion advertisement to run invisibly on a video player on the client device, and program code for receiving a second set of information comprising a second version of the companion advertisement, and program code for providing the second version of the companion advertisement to run on a video player on the client device.

Clause 49. A real-time bidding (RTB) system, including a real-time bidding engine configured to receive a plurality of bids for a video advertisement and transmit information comprising bid results, a client including a video player, configured to transmit a request for a video advertisement to the real-time bidding engine, a client-side component comprising program code stored on a tangible storage media that when executed by a processor of a client device, configures the client device to: in response to the request for a video advertisement sent by the client device, receive a first set of information associated with the video advertisement, parse the received first set of information to obtain the video advertisement and associated pixel firing information, provide the video advertisement to the video player on the client device, and fire a first pixel upon occurrence of a first predefined event.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A client-side component in a real-time bidding (RTB) system for video advertisements, the client-side component comprising program code stored on a non-transitory tangible storage media that when executed by a processor of a client device, operates the client device to:

in response to a request for a video advertisement sent by the client device to the RTB system, receive at the client-side component a first set of information associated with the video advertisement;

parse at the client-side component the received first set of information to obtain the video advertisement and to build, at the client-side component, tracking pixels corresponding to different predefined events associated with the video advertisement, wherein the predefined events include at least one of a midpoint playback of the video advertisement, a complete playback of the video advertisement, a pause in playback of the video advertisement, or a user interaction associated with the video advertisement;

provide the video advertisement from the client-side component to a video player on the client device;

fire from the client-side component, a first tracking pixel of the tracking pixels upon occurrence of a first predefined event of the predefined events associated with the video advertisement; and provide, based on the occurrence of the first predefined event, a second set of information from the client-side component to a third-party service provider that populates advertisement campaign information at the third-party service provider.

2. The client-side component of claim 1, wherein the video advertisement is one of a flash video (FLV) or a Video Player Ad-Serving Interface Definition (VPAID) unit.

3. The client-side component of claim 1, wherein the first set of information is provided through a Video Ad-Serving Template (VAST) document that includes a third-party VAST tag, and the program code when executed by the processor configures the client device to obtain the video advertisement using the third-party VAST Tag.

4. The client-side component of claim 1, wherein the program code when executed by the processor configures the client device to further provide an overlay on the video advertisement.

5. The client-side component of claim 4, wherein the overlay provides one or more of the following: an icon, a selection menu, or a feedback button.

6. The client-side component of claim 1, wherein the predefined events further include at least one of: a reception of an advertisement impression, an initiation of playback of the video advertisement, a first quartile playback of the video advertisement, a third quartile playback of the video advertisement, a resizing of the video advertisement, or a change in audio level of the video advertisement.

7. The client-side component of claim 1, wherein the program code when executed by the processor further configures the client device to obtain a uniform resource locator (URL) corresponding to a web page in which the video advertisement is to be played.

8. The client-side component of claim 1, wherein the program code when executed by the processor further configures the client device to:

execute a program associated with a second third-party service provider; and fire one or more pixels to a destination provided by the second third-party service provider upon occurrence of a second predefined event as defined by the second third-party service provider.

9. The client-side component of claim 1, wherein the program code when executed by the processor configures the client side component to operate as an interface between a video player on the client device, and a provider of the video advertisement.

10. The client-side component of claim 1, wherein the client-side component is reconfigurable so that additional functionalities can be added or removed from the client side component in each new version of the client-side component or each new version of an associated configuration file.

11. The client-side component of claim 1 wherein the client-side component is no larger than about 30 Kbytes.

12. The client-side component of claim 1, wherein the predefined events include one or more predefined events indicating elapsed time periods of the video advertisement.

13. The client-side component of claim 1, wherein the first predefined event occurs after the video advertisement is played on the video player.

14. The client-side component of claim 1, wherein the client-side component runs in an ad player on the client device.

15. The client-side component of claim 1, wherein the client device is a mobile phone.

16. A method for facilitating playback and tracking a video advertisement in a real-time bidding (RTB) system, the method comprising:

receiving a client-side component to reside on a non-transitory tangible storage medium at a client device;

in response to a request for the video advertisement sent by the client device to the RTB system, receiving at the client-side component, a first set of information associated with the video advertisement;

parsing the received first set of information by the client-side component to obtain the video advertisement and building, at the client-side component, tracking pixels corresponding to respective predefined events associated with the video advertisement, wherein the predefined events include at least one of a midpoint playback of the video advertisement, a complete playback of the video advertisement, a pause in playback of the video advertisement, or a user interaction associated with the video advertisement;

providing the video advertisement from the client-side component to a video player on the client device;

firing by the client-side component a first tracking pixel of the tracking pixels upon occurrence of a first predefined event of the predefined events associated with the video advertisement; and providing, based on the occurrence of the first predefined event, a second set of information from the client-side component to a third-party service provider that populates advertisement campaign information at the third-party service provider.

17. The method of claim 16, wherein the first set of information is provided through a Video Ad-Serving Template (VAST) document that includes a third-party VAST tag, and the video advertisement is obtained using the third-party VAST Tag.

18. The method of claim 16, further comprising providing an overlay for display on top the video advertisement.

19. The method of claim 18, wherein the overlay provides one or more of the following: an icon, a selection menu, or a feedback button.

20. The method of claim 16, further comprising:

executing a program associated with a second third-party service provider; and firing one or more pixels to a destination provided by the third-party service provider upon occurrence of a second predefined event as defined by the second third-party service provider.

21. The method of claim 16, wherein the client side component operates as an interface between a video player on the client device, and a provider of the video advertisement.

22. The method of claim 16, wherein the client-side component is reconfigurable so that additional functionalities can be added or removed from the client side component in each new version of the client-side component or each new version of an associated configuration file.

23. The method of claim 16, wherein the client-side component is no larger than about 30 Kbytes.

24. The method of claim 16, wherein the client-side component runs in an ad player on the client device.

25. The method of claim 16, wherein the client device is a mobile phone.

26. A computer program product for facilitating playback and tracking a video advertisement in a real-time bidding (RTB) system, the computer program product embodied on a non-transitory storage medium at a client device of the RTB system, the computer program product comprising:

program code for, in response to a request for the video advertisement sent by the client device to the RTB system, receiving, at a client-side component residing at the client device, a first set of information associated with the video advertisement;

program code for parsing, at the client-side component, the received first set of information to obtain the video advertisement and building, at the client-side component, tracking pixels corresponding to respective predefined events associated with the video advertisement, wherein the predefined events include at least one of a midpoint playback of the video advertisement, a complete playback of the video advertisement, a pause in playback of the video advertisement, or a user interaction associated with the video advertisement;

program code for providing the video advertisement from the client-side component to a video player on the client device;

program code for firing from the client-side component a first tracking pixel of the tracking pixels upon occurrence of a first predefined event of the predefined events associated with the video advertisement; and program code for providing, based on the occurrence of the first predefined event, a second set of information from the client-side component to a third-party service provider that populates advertisement campaign information at the third-party service provider.

27. The computer program product of claim 26, wherein the client-side component runs in an ad player on the client device.

28. The computer program product of claim 26, wherein the client device is a mobile phone.

* * * * *